United States Patent
Ren et al.

(10) Patent No.: US 9,260,568 B2
(45) Date of Patent: Feb. 16, 2016

(54) METHOD OF CURING THERMOPLASTIC POLYMER FOR SHAPE MEMORY MATERIAL

(71) Applicants: Jiaxiang Ren, Houston, TX (US); David Gerrard, Magnolia, TX (US); James Edward Goodson, Porter, TX (US); Ping Duan, Cypress, TX (US); Lillian Guo, Houston, TX (US)

(72) Inventors: Jiaxiang Ren, Houston, TX (US); David Gerrard, Magnolia, TX (US); James Edward Goodson, Porter, TX (US); Ping Duan, Cypress, TX (US); Lillian Guo, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 266 days.

(21) Appl. No.: 13/967,706

(22) Filed: Aug. 15, 2013

(65) Prior Publication Data
US 2014/0167312 A1    Jun. 19, 2014

Related U.S. Application Data

(62) Division of application No. 13/179,230, filed on Jul. 8, 2011.

(51) Int. Cl.
| | |
|---|---|
| B29C 43/02 | (2006.01) |
| C08G 75/14 | (2006.01) |
| B29C 43/00 | (2006.01) |
| C08L 81/04 | (2006.01) |

(52) U.S. Cl.
CPC ............. *C08G 75/14* (2013.01); *B29C 43/003* (2013.01); *C08L 81/04* (2013.01)

(58) Field of Classification Search
None
See application file for complete search history.

(56) References Cited

U.S. PATENT DOCUMENTS

| | | |
|---|---|---|
| 2,466,963 A | 4/1949 | Patrick et al. |
| 3,487,052 A | 12/1969 | Koons et al. |
| 3,600,341 A | 8/1971 | Schmidt et al. |
| 3,699,087 A | 10/1972 | Brown et al. |
| 3,705,131 A | 12/1972 | Korshak |
| 3,737,411 A | 6/1973 | Scoggins |
| 3,758,630 A | 9/1973 | Bilow |
| 3,782,458 A | 1/1974 | Slack |
| 3,792,099 A | 2/1974 | Wang et al. |
| 3,793,281 A | 2/1974 | Acle, Jr. |
| 3,954,932 A | 5/1976 | Coale |
| 4,020,054 A | 4/1977 | Fodor |

(Continued)

FOREIGN PATENT DOCUMENTS

| | | |
|---|---|---|
| EP | 2009723 A1 | 12/2008 |
| FR | 2135110 A1 | 12/1972 |

(Continued)

OTHER PUBLICATIONS

Collins et al., "Thermal Fatigue and Failure Analysis of SnAgCu Solder Alloys with Minor Pb Additions", IEEE Transactions on Components, Packaging and Manufacturing Tech. vol. 1, No. 10 (Oct. 2011).

(Continued)

*Primary Examiner* — Edmund Lee
(74) *Attorney, Agent, or Firm* — Cantor Colburn LLP

(57) ABSTRACT

A method of preparing a cured thermoplastic material includes curing a thermoplastic polymer having a thermal decomposition temperature greater than or equal to about 200° C., at a temperature of about 200° C. to about 400° C., for a total time of less than or equal to 200 hours. A method of making a shape memory material also includes curing a thermoplastic polymer to prepare a cured thermoplastic material.

20 Claims, 1 Drawing Sheet

(56) References Cited

U.S. PATENT DOCUMENTS

| | | |
|---|---|---|
| 4,137,970 A | 2/1979 | Laflin et al. |
| 4,191,254 A | 3/1980 | Baughman et al. |
| 4,308,352 A | 12/1981 | Knaus |
| 4,414,269 A | 11/1983 | Lubowitz et al. |
| 4,415,269 A | 11/1983 | Fraser |
| 4,431,761 A | 2/1984 | Hergenrother |
| 4,475,847 A | 10/1984 | Cornely et al. |
| 4,591,615 A | 5/1986 | Aldred et al. |
| 4,690,972 A | 9/1987 | Johnson et al. |
| 4,862,967 A | 9/1989 | Harris |
| 4,940,733 A | 7/1990 | Kuphal et al. |
| 5,086,125 A | 2/1992 | Ohta et al. |
| 5,272,247 A | 12/1993 | Sotokawa et al. |
| 5,488,084 A | 1/1996 | Kadoi et al. |
| 5,580,931 A | 12/1996 | Aguirre |
| 5,789,083 A | 8/1998 | Thomas |
| 5,803,172 A | 9/1998 | Rajkovich |
| 5,886,130 A | 3/1999 | Trimmer et al. |
| 5,976,437 A | 11/1999 | Marrocco, III et al. |
| 6,001,934 A | 12/1999 | Yamanaka et al. |
| 6,160,239 A | 12/2000 | Cubero Pitel |
| 6,446,717 B1 | 9/2002 | White et al. |
| 6,485,806 B1 | 11/2002 | Tateyama et al. |
| 6,854,522 B2 | 2/2005 | Brezinski et al. |
| 6,896,063 B2 | 5/2005 | Chang et al. |
| 6,907,936 B2 | 6/2005 | Fehr et al. |
| 6,907,937 B2 | 6/2005 | Whanger et al. |
| 6,976,537 B1 | 12/2005 | Verret |
| 6,977,057 B2 | 12/2005 | Reitz et al. |
| 7,045,082 B2 | 5/2006 | Dietzen et al. |
| 7,109,249 B2 | 9/2006 | Bruza et al. |
| 7,268,193 B2 | 9/2007 | Marrocco, III et al. |
| 7,291,201 B2 | 11/2007 | Duh et al. |
| 7,387,158 B2 | 6/2008 | Murray et al. |
| 7,392,852 B2 | 7/2008 | Richard |
| 7,615,476 B2 | 11/2009 | Hua |
| 7,655,705 B2 | 2/2010 | Scherzer et al. |
| 7,743,825 B2 | 6/2010 | O'Malley et al. |
| 8,048,348 B2 | 11/2011 | Duan et al. |
| 8,167,190 B1 | 5/2012 | Bullock et al. |
| 8,519,505 B2 | 8/2013 | Hiroshige et al. |
| 8,604,157 B2 | 12/2013 | Gerrard et al. |
| 8,939,222 B2 | 1/2015 | Ren et al. |
| 2003/0032739 A1 | 2/2003 | Kerres et al. |
| 2003/0069082 A1 | 4/2003 | Sullivan |
| 2003/0132271 A1 | 7/2003 | Kao et al. |
| 2004/0112478 A1 | 6/2004 | Bieler et al. |
| 2004/0138321 A1 | 7/2004 | Hashimoto et al. |
| 2004/0259446 A1 | 12/2004 | Jain et al. |
| 2004/0266940 A1 | 12/2004 | Issari |
| 2005/0089688 A1 | 4/2005 | Mungioli et al. |
| 2005/0205263 A1 | 9/2005 | Richard |
| 2006/0011267 A1 | 1/2006 | Kay et al. |
| 2006/0019090 A1 | 1/2006 | Wessling et al. |
| 2006/0045395 A1 | 3/2006 | Shimazu et al. |
| 2006/0051540 A1 | 3/2006 | Kagawa et al. |
| 2006/0124304 A1 | 6/2006 | Bloess et al. |
| 2006/0125136 A1 | 6/2006 | Kratzmuller |
| 2007/0020417 A1 | 1/2007 | Murakami et al. |
| 2007/0021549 A1 | 1/2007 | Kojima et al. |
| 2007/0072828 A1 | 3/2007 | Yoo |
| 2007/0106050 A1 | 5/2007 | Sokolowski et al. |
| 2007/0240877 A1 | 10/2007 | O'Malley et al. |
| 2008/0161453 A1 | 7/2008 | Lee et al. |
| 2008/0220567 A1 | 9/2008 | Mahler et al. |
| 2009/0036605 A1 | 2/2009 | Ver Meer |
| 2009/0084539 A1 | 4/2009 | Duan et al. |
| 2009/0118458 A1 | 5/2009 | Inabe |
| 2009/0131557 A1 | 5/2009 | Uyama et al. |
| 2009/0242850 A1 | 10/2009 | Park et al. |
| 2010/0012708 A1 | 1/2010 | Steward et al. |
| 2010/0089565 A1 | 4/2010 | Duan et al. |
| 2010/0210813 A1 | 8/2010 | Foder et al. |
| 2011/0003955 A1 | 1/2011 | Nishino et al. |
| 2011/0052444 A1 | 3/2011 | Hrametz et al. |
| 2011/0139314 A1 | 6/2011 | Ho et al. |
| 2011/0144223 A1 | 6/2011 | Sriram et al. |
| 2011/0162788 A1 | 7/2011 | Mizrahi et al. |
| 2012/0090830 A1 | 4/2012 | O'Malley et al. |
| 2012/0178834 A1 | 7/2012 | Linder et al. |
| 2012/0305238 A1 | 12/2012 | Duan et al. |
| 2013/0062049 A1 | 3/2013 | Ren et al. |
| 2013/0256991 A1 | 10/2013 | Ramon et al. |

FOREIGN PATENT DOCUMENTS

| | | |
|---|---|---|
| JP | 59157151 A | 9/1984 |
| JP | 9096186 A | 4/1997 |
| WO | 9207024 A1 | 4/1992 |
| WO | 03014517 A1 | 2/2003 |
| WO | 2005052316 A2 | 6/2005 |
| WO | 2005059304 A1 | 6/2005 |
| WO | 2007101845 A2 | 9/2007 |
| WO | 2010095139 A1 | 8/2010 |

OTHER PUBLICATIONS

Dan Lu et al., "Effects of Ball Milling Dispersion of Nano-SiOx Particles on ImpactStrength and Crystallization Behavior of Nano-SiOx-Poly(phenylene sulfide) Nanocomposites," Polymer Engineering and Science, 2006, pp. 820-825.

Fu Guo, "Composite lead-free electronic solders", J Mater Sci: Mater Electron 18:129-145 (2007).

Hawkins, Richard T.; Chemistry of the Cure of Poly(p-phenylene sulfide); Macromolecules; 9(2); pp. 189-194; (1976).

International Search Report and Written Opinion; International Application No. PCT/US2012/045550; International Filing Date: Jul. 5, 2012; Date of Mailing: Jan. 25, 2013; 8 pages.

International Search Report and Written Opinion; International Application No. PCT/US2012/045552; International Filing Date: Jul. 5, 2012; Date of Mailing Jan. 25, 2013; 8 pages.

International Search Report and Written Opinion; International Application No. PCT/US2012/054083; International filing date Sep. 7, 2012; Date of mailing Dec. 14, 2012 (8 pages).

International Search Report for International Application No. PCT/US2012/057033; International filing date: Sep. 25, 2012; Date of mailing: Mar. 29, 2013 (4 pgs).

International Search Report for International Application No. PCT/US2012/059682; International filing date: Oct. 11, 2012; Date of mailing: Mar. 29, 2013 (4 pgs).

International Search Report for International Application No. PCT/US2012/061098; International filing date: Oct. 19, 2012; Date of mailing: Mar. 12, 2013 (3 pgs).

Mather, et al.; "Shape Memory Polymer Research"; Annu. Rev. Mater. Res.; 39; pp. 445-471; (2009).

Meng, et al.; "A Review of Shape Memory Polymer Composites and Blends"; Composites: Part A; 40; pp. 1661-1672; (2009).

PCT International Search Report and Written Opinion; International Application No. PCT/US2013/069076; International Filing Date: Nov. 8, 2013; Date of Mailing: Feb. 27, 2014; pp. 1-9.

PrimoSpire PR-250 Product Data Sheet, Solvay Specialty Polymers, Sep. 28, 2010, 3 pages.

Ren, et al.; "Development and Characterization of an Elastomeric Material for High-Pressure and High-Temperature Downhole Sealing Applications"; Presentation at 2011 World Oil HPHT Drilling and Completion Conference; Abstract Date Mar. 11, 2011.

Stacy et al. "Molecular Weight Distribution of Polyphenylene Sulfide by High Temperature Gel Permeation Chromatography" Journal of Applied Polymer Science, vol. 32, pp. 3959-3969, (1986).

Sun et al., "Preparation, characterization, and mechanical properties of some microcellular polysulfone foams", Journal of Applied Polymer Science, vol. 86, Issue 7, pp. 1692-1701, Nov. 14, 2002.

Takemoto et al., "Electrochemical Migration Tests of Solder Alloys in Pure Water", Corrosion Science, vol. 39, No. 8. pp. 1415-1430 (1997).

Chemical Abstracts Service, Colbumbus, Ohio, US; Mar. 31, 2000, Bloom, Paul D. et al.: "Synthesis of self-crosslinking poly

(56) References Cited

OTHER PUBLICATIONS (P-phenylene s", XP002734847; and Polymer Preprints (American Chemical Society, Division of Polymer Chemistry), ISSN: 0032-3934.

Korshak V V et al. "Some thermal characteristics of branched and crosslinked polyphenylenes", Polymer Science U.S.S.R, Pergamon Press, Oxford, vol. 15, No. 10, Jan. 1, 1973, pp. 2465-2470, XP024113209, ISSN: 0032-3950, DOI: 10.1016/0032-3950(73)90002.

Tour J M: "Soluble Oligo- and Polyphenylenes", Advanced Materials, Wiley-V C H Verlag GMBH & Co. KGAA, DE, vol. 6, No. 3, Mar. 1, 1994, pp. 190-198, XP000429216, ISSN: 0935-9648, DOIU: 10.1002/ADMA. 19940060303.

Meng et al.; "A Review of Shape Memory Polymer Composites and Blends"; Composites: Part A 40; pp. 1661-1672; (2009).

Ren, et al.; "Development and Characterization of an Elastomeric Material for High-Pressure and High-Temperature Downhole Sealing Applications"; Presentation at 2011 World Oil HPHT Drilling and Completion Conference; Abstract Date Mar. 11, 2011; only one page.

METHOD OF CURING THERMOPLASTIC POLYMER FOR SHAPE MEMORY MATERIAL

CROSS REFERENCE TO RELATED APPLICATIONS

This application is a divisional application of U.S. nonprovisional application Ser. No. 13/179,230 filed on Jul. 8, 2011. The parent application is incorporated by reference herein in its entirety.

BACKGROUND

Shape memory polymers (SMPs) are polymers which regain their original shape when heated above their glass transition temperature (Tg). Articles are formed from shape memory polymer by first heating above the glass transition temperature and then shaping the polymer, then subsequently fixing the shape by cooling to below the glass transition temperature. During deployment, the shaped article is heated above the glass transition temperature to allow recovery of the first molded shape.

Shape memory polymers are useful as materials of construction of elements for variety of downhole applications, particularly those which require the sealing off of a portion of a borehole, or constricting the spacing around an element, whether coaxial with the borehole or otherwise. While a number of different shape memory polymers are commercially available, SMPs having still greater thermal and chemical stability, as well as low cost, are desirable.

SUMMARY

The above and other deficiencies of the prior art are overcome by a method of preparing a cured thermoplastic material comprising curing a thermoplastic polymer having a thermal decomposition temperature greater than or equal to about 200° C., at a temperature of about 200° C. to about 400° C., for a total time of less than or equal to 200 hours.

In another embodiment, a method of preparing a shape memory material comprises curing a thermoplastic polymer, having a thermal decomposition temperature greater than or equal to about 200° C., at a temperature of about 200° C. to about 400° C. and for a curing time of less than or equal to about 200 hours; compacting the cured thermoplastic polymer at a temperature of less than or equal to about 200° C., heating the cured thermoplastic polymer at a temperature of about 300° C. to about 400° C. for greater than or equal to about 2 hours, compression molding the cured thermoplastic polymer, and de-molding at a temperature greater than or equal to about the glass transition temperature of the cured thermoplastic polymer.

In another embodiment, a method of preparing a shape memory material, comprises compounding a thermoplastic polymer having a thermal decomposition temperature greater than or equal to about 200° C., with a crosslinker, and optionally, an additive, to form a mixture; compacting the mixture at room temperature; heating and curing the compacted mixture at a temperature of about 300 to about 400° C., for a heating time of less than or equal to about 72 hours to cure the thermoplastic polymer; compression molding the cured thermoplastic polymer; and de-molding at a temperature greater than or equal to about the glass transition temperature of the cured thermoplastic polymer.

BRIEF DESCRIPTION OF THE DRAWINGS

Referring now to the drawings, wherein like elements are numbered alike in the several Figures.

DETAILED DESCRIPTION OF THE INVENTION

Figure 1:
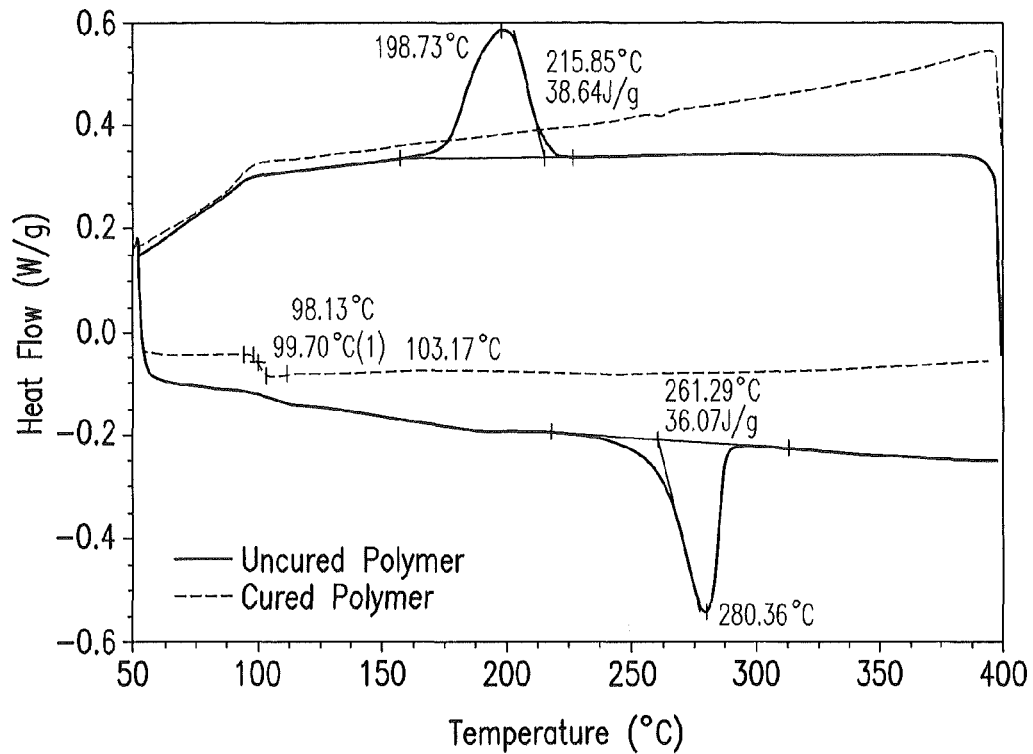
FIG. 1 shows a differential scanning calorimetry (DSC) trace of an uncured and cured thermoplastic polymer.

A cured thermoplastic material as disclosed herein is prepared by thermal cure of a high-temperature thermoplastic polymer, in the presence of oxygen. The cured thermoplastic polymer has lower crystallinity and greater thermal stability than the thermoplastic material prior to curing, as well as improved shape memory properties such as more rapid recovery rate, and near-quantitative recovery of at least one precompression dimension.

Thermoplastic polymers curable by the method are not particularly limited provided they are high-temperature thermoplastics having balanced mechanical properties at high temperature, as well as good chemical resistance, and which are curable by an oxidative crosslinking mechanism.

High temperature thermoplastic polymers include those having a thermal stability, as evidenced by the thermal decomposition temperature, of greater than or equal to about 200° C., in another embodiment greater than or equal to about 250° C., and in another embodiment greater than or equal to about 300° C. The thermoplastic polymer is semi-crystalline or amorphous.

The thermoplastic polymer has a weight averaged molecular weight (Mw) of about 500 to about 100,000 g/mol, in another embodiment about 1,000 to about 75,000 g/mol, in another embodiment about 1,500 to about 50,000 g/mol, and in another embodiment about 2,000 to about 25,000 g/mol. In addition, the thermoplastic polymer has a melt flow, determined according to ASTM D 1283 at 316° C. under a 5 kg load, of greater than or equal to about 1 g/10 minutes, in another embodiment greater than or equal to about 10 g/10 minutes, and in another embodiment greater than about 50 g/10 minutes. Also, the thermoplastic polymer has a melt flow, determined according to ASTM D 1283 at 316° C. under a 5 kg load, of less than or equal to about 7,500 g/10 minutes, in another embodiment less than or equal to about 6,500 g/10 minutes, and in another embodiment less than or equal to about 5,500 g/10 minutes.

The thermoplastic polymer is linear or branched, having a number of branches of greater than or equal to 1, in another embodiment greater than or equal to 2, and in another embodiment greater than or equal to 5 branching points per 1,000 carbon atoms along the polymer chain.

In an embodiment, the thermoplastics used herein are aromatic thermoplastics. Examples of thermoplastic polymers include polyamides, polyimides, polyetherimides, polyphenylene sulfides (PPS), polyaryletherketones (PAEK), polyetherether ketones (PEEK), polyethersulfones (PESU), polyphenylenesulfones (PPSU), polyphenylenesulfone ureas, or the like, or combinations comprising at least one of the foregoing. The thermoplastic polymers are linear or branched and include homopolymers or copolymers which include two or more of the foregoing exemplary polymers. Copolymers include random, alternating, graft, and block copolymers having two or more blocks of different homopolymers, random, or alternating copolymers. The thermoplastic polymers can further be chemically modified to include, for example, functional groups or can be oxidized, hydrogenated, etc. Exemplary thermoplastics include polyphenylene sulfides with either a branched structure, such as those marketed under the tradename RYTON® by Chevron-Phillips, or a linear structure, such as those marketed under the tradename FORTRON® by Ticona. The thermoplastic polymer can be obtained and used in either pellet or powder form.

In an embodiment, reactive elastomer or fluoropolymer is blended with the thermoplastic polymer before cure, and grafts to the thermoplastic polymer during cure to increase flexibility of the cured thermoplastic material. Exemplary useful reactive elastomers or fluoropolymers include nitrile-butyl rubber (NBR), hydrogenated nitrile-butyl rubber (HNBR), high fluorine content fluoroelastomers rubbers such as those in the FKM family and marketed under the tradename VITON® (available from FKM-Industries) and perfluoroelastomers such as FFKM (also available from FKM-Industries) and also marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

In an embodiment, the method of preparing the cured thermoplastic material includes curing the thermoplastic polymer in the presence or absence of oxygen. In an embodiment, oxygen is used as a portion of the atmosphere as either pure oxygen or a mixture of gases. Where a mixture of gases is used, oxygen is mixed with any suitable inert gas such as, for example, nitrogen, helium, argon, carbon dioxide, or the like. In an embodiment, curing is carried out in air. Ambient pressure can be used, or a partial pressure lower than ambient, or at elevated pressures (>1 atmosphere).

Curing is carried out at a temperature of about 200 to about 400° C., in another embodiment about 250 to about 390° C., and in another embodiment about 300 to about 380° C. The curing time is for a total time of less than or equal to 200 hours. In an embodiment, where curing is in the presence of oxygen and/or a crosslinker, the curing time is for a total time of less than or equal to about 72 hours, in another embodiment less than or equal to about 48 hours, and in another embodiment less than or equal to about 24 hours. Also in an exemplary embodiment, curing is carried out at a temperature of about 350 to about 375° C., for a time of about 1 to about 20 hours, in another embodiment about 2 to about 6 hours, in air atmosphere at ambient pressure. In another exemplary embodiment, curing is carried out at a temperature of about 350 to about 375° C., for a time of about 1 to about 200 hours, in the absence of oxygen and at ambient pressure. It will be understood that where the curing temperature is close to or at about the thermal decomposition temperature, a combination of curing temperature and time is used such that during curing, the cured thermoplastic material exhibits less than or equal to 10% weight loss, in another embodiment less than 5% weight loss, and in another embodiment less than 1% weight loss.

The cured thermoplastic material is partially cured, or fully cured. Where the thermoplastic polymer is fully cured, the cured thermoplastic material is completely amorphous, without showing a melting temperature ($T_m$) transition by, for example, differential scanning calorimetry (DSC) which corresponds to the melting of any of the crystalline regions of the semi-crystalline high temperature thermoplastic polymer. Alternatively, the cured thermoplastic material is partially cured, where analysis by DSC shows a reduction in the heat flow at the melting temperature ($T_m$) relative to that of the uncured thermoplastic polymer. Where the cured thermoplastic material is only partially cured, the cured thermoplastic material is semi-crystalline. As used herein, "semi-crystalline" means having a degree of crystallinity less than that of the uncured thermoplastic material. For example, where the thermoplastic material is about 30% crystalline (based on weight or volume) prior to curing, the cured thermoplastic material can after partial cure be about 10% crystalline. Partial cure may also be localized, based on the degree of exposure of the thermoplastic polymer to the oxygen atmosphere during curing. For example, where the thermoplastic polymer is provided as a pellet or particle, partial cure can be obtained where the outermost, exposed portion (surface or layer) of a particle of the cured thermoplastic material is cured and has a low crystallinity (e.g., less than or equal to about 5% crystallinity, in another embodiment less than or equal to about 2% crystallinity, and in another embodiment less than or equal to about 1% crystallinity, based on weight or volume), or is fully amorphous, while the interior of the pellet or particle is uncured. The portion cured, in this instance, corresponds to the diffusion depth of the oxygen into the pellet or particle during cure, and varies with cure condition, i.e., temperature, pressure, oxygen concentration, and time.

Both the uncured thermoplastic polymer and the cured thermoplastic material each have a glass transition temperature $T_g$ higher than ambient temperature. In an embodiment, the cured thermoplastic material has a $T_g$, corresponding to the amorphous regions, of greater than or equal to about 50° C., in another embodiment greater than or equal to about 60° C., in another embodiment greater than or equal to about 70° C., and in another embodiment greater than or equal to about 90° C.

Also in an embodiment, the cured thermoplastic material has a storage modulus of greater than or equal to about 1 megapascal, in another embodiment about 1.2 megapascals, and in another embodiment greater than or equal to about 1.5 megapascals, determined at a temperature of greater than or equal to about 250° C., in another embodiment greater than or equal to about 275° C., and in another embodiment greater than or equal to about 300° C.

The method further includes, in another embodiment, compounding the thermoplastic polymer with an additive, prior to curing to form the thermoplastic material. Additive, as broadly used herein, includes any compound added to the thermoplastic to adjust the properties of the cured thermoplastic material, such as a water-soluble additive useful for preparing a foam, or other additive such as a filler, crosslinker, or processing aid.

Fillers, as used herein, include reinforcing and non-reinforcing fillers. Reinforcing fillers include, for example, silica, glass fiber, carbon fiber, or carbon black, which can be added to the polymer matrix to increase strength. Non-reinforcing fillers such as polytetrafluoroethane (PTFE), $MoS_2$, or graphite can be added to the polymer matrix to increase the lubrication. Nanofillers are also useful, and can be reinforcing or non-reinforcing. Nanofillers, such as a carbon nanotubes, nanographenes, nanoclays, polyhedral oligomeric silsesquioxane (POSS), or the like, can be incorporated into the polymer matrix to increase the strength and elongation of the material. Nanofillers can further be functionalized to include grafts or functional groups to adjust properties such as solubility, surface charge, hydrophilicity, lipophilicity, and other properties. Combinations comprising at least one of the foregoing fillers can be used.

In an embodiment, the crosslinker is elemental sulfur, silica, a quinone, a peroxy compound, a metal peroxide, a metal oxide, or a combination comprising at least one of the foregoing crosslinkers. Exemplary quinones include p-benzoquinone, tetramethylbenzoquinone, naphthoquinone, and the like. Peroxy compounds useful as crosslinkers include alkyl or aryl diperoxy compounds. Exemplary aryl diperoxy compounds include those based on dicumyl peroxide (DCP) and marketed by Arkema, Inc. under the tradename DI-CUP® including, DI-CUP® dialkyl peroxide, DI-CUP® 40C dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Exemplary metal peroxides include magnesium peroxide, calcium peroxide, zinc peroxide, or the like, or a combination comprising at least one of the foregoing. Metal oxides useful as crosslinkers include, for example, zinc oxide, magnesium oxide, titanium dioxide, or the like, or a combination thereof.

A processing aid is a compound included to improve flow, moldability, and other properties of the cured thermoplastic material. Processing aids include, for example an oligomer, a wax, a resin, a fluorocarbon, or the like, or a combination comprising at least one of the foregoing. Exemplary processing aids include stearic acid and derivatives, low molecular weight polyethylene, and the like.

In preparing a mixture for a shape memory foam, a water-soluble additive is included. Exemplary water-soluble additives include salts such as sodium chloride, potassium chloride, potassium iodide, sodium sulfate, or other salt having a high solubility in water. Pore size, closed versus open cell porosity, and distribution are controlled by the concentration and particle size of the water-soluble additive.

The cured thermoplastic material is pulverized prior to any compounding and/or molding. Pulverizing can be done by any suitable method including use of a mortar and pestle, ball mill, grinder, or the like, so long as the particle size of the resultant pulverized cured thermoplastic material is suitable for adequate mixing. Any suitable particle size can be obtained by the pulverizing. In an embodiment, the thermoplastic material is pulverized into a particle size of less than or equal to about 10 mesh, in another embodiment less than or equal to about 20 mesh, and in another embodiment less than or equal to about 40 mesh. It will be understood that "less than" a mesh size refers to particle size defined by mesh number which is inversely correlated to particle size, i.e., the higher the mesh number, the smaller the particle size.

In another embodiment, a method of preparing a shape memory material includes curing the thermoplastic polymer in the presence of oxygen, compacting the cured thermoplastic polymer at a low processing temperature (for example, at less than or equal to about 200° C.), heating the cured thermoplastic polymer to a temperature greater than the glass transition temperature of the cured thermoplastic polymer, compression molding the cured thermoplastic polymer, and de-molding at a temperature greater than or equal to about the glass transition temperature of the cured thermoplastic polymer. In this embodiment, curing and heating are effected in separate steps.

Heating the cured thermoplastic polymer, generally as distinguished from curing, is similarly carried out at a temperature of about 200° C. to about 400° C., in another embodiment about 250 to about 400° C., and in another embodiment about 300° C. to about 400° C. The heating time is be for a total time of greater than or equal to 2 hours, in another embodiment greater than or equal to about 5 hours, and in another embodiment about 5 to about 20 hours. Heating, in this instance, refers to heating the cured thermoplastic polymer above its glass transition temperature after cold molding, to retain the memory shape during the first molding step.

In another embodiment, a method of preparing a shape memory material includes compounding the thermoplastic polymer with a crosslinker and optionally, an additive, to form a mixture, compacting the mixture at room temperature, and heating the compression molded mixture in the presence of oxygen or without oxygen to a temperature greater than the glass transition temperature of the cured thermoplastic polymer. A heating time of less than or equal to about 200 hours is used to cure the thermoplastic polymer; when heating is done in the presence of oxygen, a shorter heating time of less than or equal to about 24 hours is used, and when heating is done in the absence of oxygen, a longer heating time of less than or equal to 200 hours is used to cure the thermoplastic polymer. Compression molding of the cured thermoplastic polymer at above the glass transition temperature of the cured thermoplastic polymer, and de-molding at a temperature greater than or equal to about the glass transition temperature of the cured thermoplastic material, are then carried out. In this embodiment, heating is carried out at a temperature sufficient to cure the thermoplastic polymer, and hence curing and heating to above the glass transition temperature of the cured thermoplastic polymer is effected in the same step.

Where the shape memory material is a foam, the method further includes compounding the thermoplastic polymer with a water-soluble additive, prior to curing. The method of making the shape memory foam further includes removing the water-soluble additive after de-molding. Removal of the water-soluble additive is accomplished by soaking and/or extracting the de-molded article with a suitable solvent (such as water, where a water-soluble additive is used), and is accomplished in batch or continuous mode, at ambient or elevated temperatures and pressures.

The shape memory material, so prepared by the method, exhibits improved shape memory properties when compared with a comparable shape memory material but prepared with an uncured thermoplastic polymer. For example, a shape memory material, prepared using the cured thermoplastic material, and when compacted by 30% based on pre-compacting volume, has a recovery time during deployment of less than or equal to about 10 minutes, measured at about 10 psi at about 160° C. Also, a shape memory material prepared using the cured thermoplastic material, and when compacted by about 30% based on pre-compacting volume, recovers greater than or equal to about 90%, in another embodiment greater than or equal to about 93%, in another embodiment greater than or equal to about 95%, and in another embodiment greater than or equal to about 97%, of at least one dimension. It will be understood that shape recovery dimensions are determined upon deployment by heating the shape memory material at or above the glass transition temperature of the cured thermoplastic material.

Furthermore, the shape memory material shows high resistance when exposed to a chemical agent at a temperature greater than room temperature and pressure greater than atmospheric pressure. In this way, the shape memory material shows less reduction in properties such as, for example, glass transition temperature, than a comparable shape memory material prepared with an uncured thermoplastic polymer. In particular, the shape memory material, and the cured thermoplastic material, resist swelling and degradation of properties when exposed to chemical agents (e.g., water, brine, hydrocarbons, acids such as sulfuric acid, solvents such as toluene, etc.), even at elevated temperatures of up to 100° C., and at elevated pressures (greater than atmospheric pressure) or prolonged periods (e.g., of greater than one day).

The method above is used to prepare shape memory materials for elements useful in downhole applications. Exemplary elements include a packer element, a blow out preventer element, or other downhole elements.

The above embodiments are further demonstrated in the following examples, which are intended as illustrative only and are not intended to be limited thereto.

Curing of Polyphenylenesulfide. A bar sample of polyphenylene sulfide (PPS; RYTON® PR09-60, Chevron-Phillips) was cured at 680° F. (360° C.) in air for 2 hours, and evaluated by differential scanning calorimetry (DSC; TA Instruments; scan rate 10° C./min.).

FIG. 1 shows the DSC trace (as a plot of Watts per gram versus temperature in ° C.). As seen in FIG. 1, an uncured sample of PPS exhibited a melting temperature ($T_m$) for the crystalline regions of about 280.4° C. (solid line), whereas the cured PPS exhibited only a glass transition temperature at about 99.7° C. Curing therefore renders the PPS amorphous as shown by the disappearance of the $T_m$ transition.

Figure 2:
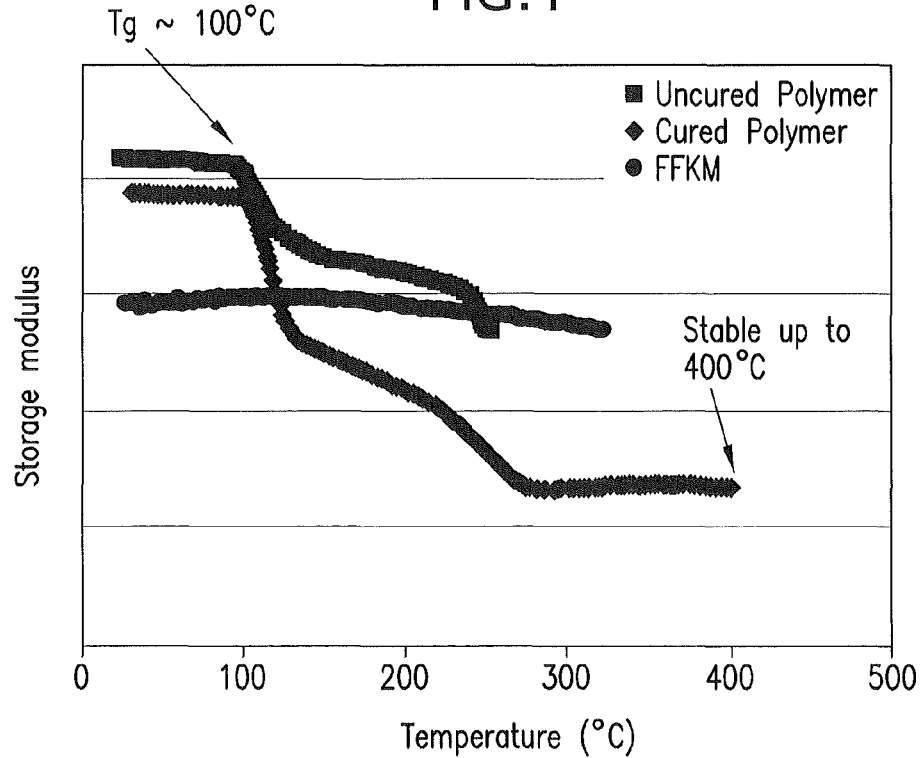
FIG. 2 is a dynamic mechanical analysis (DMA) plot of storage modulus versus temperature for a perfluoroelastomer, and an uncured and cured thermoplastic polymer.

FIG. 2 further shows a dynamic mechanical analysis (DMA) trace comparison for the cured PPS, the uncured PPS, and a perfluoroelastomer (FFKM K0090 from FKM Industries). As seen in FIG. 2, the storage modulus of cured PPS remained stable to 400° C., whereas the storage modulus of uncured PPS remained stable only to about 260° C., and that of the perfluoroelastomer remained stable only to about 320° C.

Shaped Memory of Cured PPS. Polyphenylene sulfide compacted pellets (PPS; RYTON® P-4, Chevron-Phillips) were pulverized to 20 or 40 mesh size and cured at 680° F. (360° C.) under air atmosphere for 2 hours. The cured PPS was packed into a button mold and compressed at room temperature, followed by heating to 680° F. (360° C.) under air atmosphere for 4 hours. The button mold was further compressed by 30% and heated to about the Tg of the cured PPS, and the molded cured PPS was then quenched in cold water after de-molding.

The button prior to compaction had a height of 5.84 mm and, after compaction and quench, had a height of 4.74 mm (a compaction of 19%). Upon deployment by heating to 360° C., the deployed button had a height of 5.66 mm, for a height dimension recovery of about 97%. In addition, dynamic mechanical analysis (DMA; 10 psi pressure, 160° C.) of a similarly prepared pellet shows, upon deployment, dimensional recovery in less than 7 minutes.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A method of preparing a shape memory material, the method comprising:
    compounding a thermoplastic polymer having a thermal decomposition temperature greater than or equal to about 200° C., with a crosslinker, and optionally, an additive, to form a mixture;
    compacting the mixture at room temperature;
    heating and curing the compacted mixture at a temperature of about 300 to about 400° C., for a heating time of less than or equal to about 72 hours to cure the thermoplastic polymer;
    compression molding the cured thermoplastic polymer; and
    de-molding at a temperature greater than or equal to about the glass transition temperature of the cured thermoplastic polymer.

2. The method of claim 1, wherein the thermoplastic polymer is straight-chain or branched, and is a homopolymer or copolymer comprising a polyamide, a polyimide, a polyetherimide, a polyphenylene sulfide (PPS), a polyaryletherketone (PAEK), a polyetherether ketone (PEEK), a polyethersulfone (PESU), a polyphenylenesulfone (PPSU), a polyphenylenesulfone urea, or combinations comprising at least one of the foregoing.

3. The method of claim 1, wherein the thermoplastic polymer is an aromatic thermoplastic.

4. The method of claim 1, wherein the crosslinker comprises sulfur, silica, a quinone, a peroxy compound, a metal oxide, a metal peroxide, or a combination comprising at least one of the foregoing crosslinkers.

5. The method of claim 1, wherein the additive is a reinforcing or non-reinforcing filler comprising silica, glass fiber, carbon fiber, carbon black, polytetrafluoroethane, $MoS_2$, graphite, carbon nanotube, nanographene, nanoclay, polyhedral oligomeric silsesquioxane, or a combination comprising at least one of the foregoing.

6. The method of claim 1, wherein the additive is a processing aid comprising an oligomer, a wax, a resin, a fluorocarbon, or a combination comprising at least one of the foregoing.

7. The method of claim 1, wherein compounding further comprises blending a reactive elastomer or fluoropolymer with the thermoplastic polymer before cure, wherein the reactive elastomer or fluoropolymer grafts to the thermoplastic polymer during cure to increase flexibility of the cured thermoplastic material.

8. The method of claim 1, wherein curing is carried out in the presence of oxygen or in the presence of an inert gas.

9. The method of claim 1, wherein the thermoplastic polymer is semi-crystalline or amorphous.

10. The method of claim 1, wherein the cured thermoplastic polymer is partially cured.

11. The method of claim 1, wherein the shape memory material is amorphous or semi-crystalline.

12. The method of claim 1, wherein the cured shape memory material has a glass transition temperature of greater than or equal to about 50° C.

13. The method of claim 1, wherein the cured shape memory material has a storage modulus of greater than or equal to about 1 megapascal measured at a temperature of greater than or equal to about 250° C.

14. The method of claim 1, further comprising compounding the thermoplastic polymer, with a water-soluble additive, prior to curing.

15. The method of claim 13, further comprising removing the water-soluble additive after de-molding.

16. The method of claim 1, further comprising pulverizing the thermoplastic polymer prior to compounding, wherein the pulverized cured thermoplastic polymer has a particle size of less than or equal to 10 mesh.

17. The method of claim 1, wherein the shape memory material, when compacted by about 30% based on pre-compacting volume, recovers greater than or equal to about 90% of at least one dimension.

18. The method of claim 1, wherein the shape memory material is a foam.

19. The method of claim 1, wherein the thermoplastic polymer has a weight averaged molecular weight from 500 g/mol to 100,000 g/mol.

20. The method of claim 1, wherein, after compression, a recovery of the shape memory material to a recovered dimension is less than 10 minutes.

\* \* \* \* \*